US010823821B2

(12) United States Patent
Fechner et al.

(10) Patent No.: US 10,823,821 B2
(45) Date of Patent: Nov. 3, 2020

(54) METHOD AND DEVICE FOR DETERMINING THE RANGE OF A SENSOR FOR A MOTOR VEHICLE

(71) Applicant: Conti Temic microelectronic GmbH, Nuremberg (DE)

(72) Inventors: Thomas Fechner, Wasserburg (DE); Markus Wintermantel, Lindau (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 184 days.

(21) Appl. No.: 16/073,078

(22) PCT Filed: Jan. 17, 2017

(86) PCT No.: PCT/DE2017/200003
§ 371 (c)(1),
(2) Date: Jul. 26, 2018

(87) PCT Pub. No.: WO2017/129185
PCT Pub. Date: Aug. 3, 2017

(65) Prior Publication Data
US 2019/0339361 A1 Nov. 7, 2019

(30) Foreign Application Priority Data

Jan. 28, 2016 (DE) .......................... 10 2016 201 250

(51) Int. Cl.
*G01S 7/40* (2006.01)
*G01S 7/41* (2006.01)
(Continued)

(52) U.S. Cl.
CPC ................ *G01S 7/40* (2013.01); *G01S 7/412* (2013.01); *G01S 7/497* (2013.01); *G01S 13/865* (2013.01);
(Continued)

(58) Field of Classification Search
CPC .... G01S 7/40; G01S 2007/4039; G01S 7/412; G01S 7/791; G01S 2007/4975; G01S 13/865; G01S 13/867; G01S 13/931
See application file for complete search history.

(56) References Cited

U.S. PATENT DOCUMENTS 5,485,384 A * 1/1996 Falconnet ............ G01C 21/165
342/25 A
9,201,424 B1 * 12/2015 Ogale .................... G06T 7/80
(Continued)

FOREIGN PATENT DOCUMENTS

| DE | 102006007788 | 8/2007 |
| DE | 102010049091 | 4/2012 |

(Continued)

OTHER PUBLICATIONS

English translation of the International Search Report of the International Searching Authority for International Application PCT/DE2017/200003, dated May 11, 2017, 2 pages, European Patent Office, HV Rijswijk, Netherlands.

(Continued)

*Primary Examiner* — Peter M Bythrow
(74) *Attorney, Agent, or Firm* — W. F. Fasse

(57) ABSTRACT

A device for determining the detection range of a sensor unit for a motor vehicle includes: a memory unit configured to provide a map having map data regarding a landmark and a target detection range, a reflectivity property and/or a radiant intensity respectively associated with the landmark; a sensor unit configured to detect the landmark in surroundings with an actual detection range and/or to measure a received signal intensity for the landmark; and a computing unit configured to determine a detection range of the sensor unit based on the target detection range and the actual detection range and/or based on a comparison of the received signal intensity with (Continued)

a calculated signal intensity derived from the reflectivity property and/or the radiant intensity associated with the landmark.

16 Claims, 3 Drawing Sheets

(51) Int. Cl.
  *G01S 7/497* (2006.01)
  *G01S 13/86* (2006.01)
  *G01S 13/931* (2020.01)
  *G01S 17/931* (2020.01)
(52) U.S. Cl.
  CPC .......... *G01S 13/867* (2013.01); *G01S 13/931* (2013.01); *G01S 17/931* (2020.01); *G01S 2013/9322* (2020.01); *G01S 2013/9323* (2020.01)

(56) References Cited

U.S. PATENT DOCUMENTS

| 9,534,924 | B2* | 1/2017 | Ahuja | G01C 25/00 |
| 9,541,420 | B2* | 1/2017 | Friend | G01C 21/165 |
| 9,719,801 | B1* | 8/2017 | Ferguson | G01C 25/00 |
| 9,996,986 | B2* | 6/2018 | Tan | G07C 5/00 |
| 2006/0293854 | A1* | 12/2006 | Chiou | G01S 7/40 701/301 |
| 2008/0144924 | A1* | 6/2008 | Hoffmann | G06T 7/85 382/154 |
| 2010/0076710 | A1* | 3/2010 | Hukkeri | G01S 7/52004 702/97 |
| 2011/0096165 | A1* | 4/2011 | Zeng | B60K 31/0008 348/148 |
| 2012/0101704 | A1* | 4/2012 | Wagner | G01S 7/52004 701/96 |
| 2012/0173185 | A1* | 7/2012 | Taylor | G01S 17/931 702/104 |
| 2012/0254779 | A1* | 10/2012 | Ollivierre | A61B 3/0041 715/764 |
| 2013/0173109 | A1* | 7/2013 | Hukkeri | G05D 1/0891 701/23 |
| 2013/0173201 | A1* | 7/2013 | Hukkeri | G01S 13/931 702/104 |
| 2014/0046587 | A1* | 2/2014 | Rintanen | G01S 7/4808 701/469 |
| 2014/0163859 | A1* | 6/2014 | Tsuchida | G01S 13/72 701/301 |
| 2015/0260498 | A1* | 9/2015 | Soohoo | G01S 17/87 73/1.79 |
| 2015/0362587 | A1* | 12/2015 | Rogan | G01S 17/89 702/104 |
| 2016/0069985 | A1* | 3/2016 | Kwakkernaat | G01S 5/14 342/14 |
| 2016/0139255 | A1* | 5/2016 | Bueschenfeld | G01S 13/931 342/146 |
| 2016/0187466 | A1* | 6/2016 | Kim | G01S 7/4026 342/59 |
| 2017/0023945 | A1* | 1/2017 | Cavalcanti | G08G 1/04 |
| 2017/0122741 | A1* | 5/2017 | Sakai | G01C 21/005 |
| 2017/0212215 | A1* | 7/2017 | Hellinger | G01S 7/4026 |
| 2018/0052222 | A1* | 2/2018 | Zeisler | G01S 7/52004 |

FOREIGN PATENT DOCUMENTS

| DE | 102011056050 | 6/2013 |
| DE | 102012215533 | 3/2014 |
| WO | WO 2016/177727 | 11/2016 |

OTHER PUBLICATIONS

PCT International Preliminary Report on Patentability including English Translation of PCT Written Opinion of the International Searching Authority for International Application PCT/DE2017/200003, dated Jul. 31, 2018, 12 pages, International Bureau of WIPO, Geneva, Switzerland.

German Office Action in German Patent Application No. 10 2016 201 250.9, dated Aug. 17, 2016, 5 pages, with partial English translation, 3 pages.

* cited by examiner

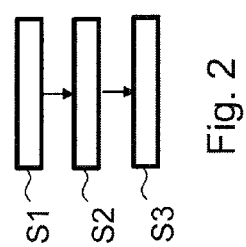
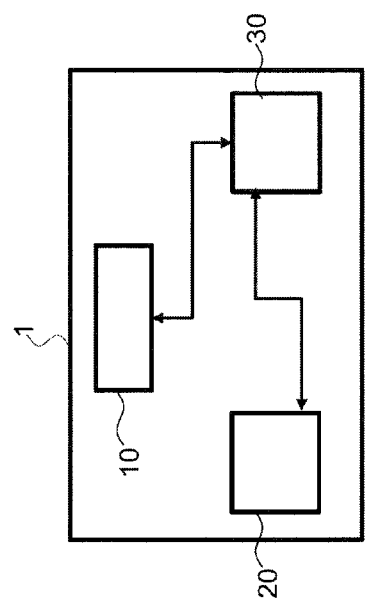

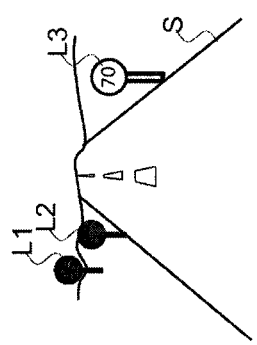

METHOD AND DEVICE FOR DETERMINING THE RANGE OF A SENSOR FOR A MOTOR VEHICLE

TECHNICAL FIELD

The present invention relates to systems for monitoring the sensor technology for a motor vehicle.

In particular, the present invention relates to a device for determining the range of a sensor for a motor vehicle, a backend and a method for determining the range of a sensor for a motor vehicle.

TECHNICAL BACKGROUND

Driver assistance systems, also known as "Advanced Driver Assistance Systems" (abbreviated to ADAS), are electronic supplementary units installed in motor vehicles in order to support the driver in certain driving situations.

Safety aspects are frequently paramount, but so too is increasing driving comfort. A further aspect is improving fuel economy and reducing fuel consumption. In the case of ADAS applications, it is necessary to determine the detection range of a sensor in different driving situations.

In the process, the prevailing detection range of the sensor can deviate from its original, prevailing detection range, for example on commissioning.

Although the sensor may be functioning normally in terms of its sensor signals, the range can be reduced, for example by contaminants or by other influences.

SUMMARY OF THE INVENTION

It is an object of the present invention to provide an improved device for determining the range of a sensor for a motor vehicle.

This object can be achieved by the subject matter of the invention as set forth herein. Embodiments and further developments are also disclosed in the description and the figures of the drawings.

A first aspect of the present invention relates to a device for determining the range of a sensor for a motor vehicle, wherein the device comprises: a memory unit, which is designed to provide, as an attribute, a map having at least one landmark and a target detection range associated with the landmark and/or a reflectivity property associated with the landmark and/or a radiant intensity associated with the landmark; a sensor unit, which is designed to detect the at least one landmark with an actual detection range and/or to measure a received signal intensity for the at least one landmark; and a computing unit, which is designed to determine a detection range of the sensor unit based on the target detection range and the actual detection range and/or based on a comparison of the signal intensity measured for the respective landmark and the signal intensity, which can be derived from the reflectivity property recorded in the map and/or the radiant intensity of the respective landmark.

The term "target detection range", as used by the present invention, describes, for example, a detection range to be achieved by the sensor during optimum conditions.

The term "actual detection range", as used by the present invention, describes, for example, a detection range currently achieved by the sensor.

The term "detection range" or respectively "determined detection range", as used by the present invention, describes, for example, a detection range which can be currently achieved by the sensor, eliminating specific operating conditions such as, for example, solar radiation or lighting conditions or, in general, the current optical visibility.

The term "radiant intensity", as used by the present invention, describes the radiation intensity, also radiation power, or luminous flux density, and is the proportion of the total radiated power which is emitted by a radiation source—the landmark—in a given spatial direction in any spatial angular element.

In other words, the computing unit is configured to determine an extrapolated detection range of the sensor unit which is corrected by environmental influences, based on a prevailing detection range of the sensor unit which is influenced by the environment.

The corrected, extrapolated detection range of the sensor unit can also be understood to be a detection range of the sensor unit which is interpolated for idealized surrounding conditions.

In other words, the map used in the form of a map which contains information such as the environment or the surroundings of the motor vehicle, for instance constituted by the prevailing infrastructure at the location of the motor vehicle, is displayed to the technology or respectively sensor technology used in each case.

In this case, a comparison between the expected representation, for instance an expected radar cross section, RCS, and the actually measured representation, for instance a measured radar cross section, can be used in order to indicate attenuation.

Knowing the attenuation of the normal sensor sensitivity—which is already measured during the production of the sensor, for example—the maximum detection range or respectively the maximum reflectivity or the reflectivity properties can be determined for any object.

In addition to the target range, a target reflectivity or respectively a target reflectivity property or respectively a target radiant intensity is therefore, for example, represented or respectively stored in the map for the respective landmark.

This reflectivity property or respectively target reflectivity property noted in the map can be represented or respectively stored independently of the sensitivity of the sensor.

The reflectivity property can describe the reflectivity of the object during irradiation with radar and quantifies the backscatter per area for extensive reflectors such as, for instance, a road.

A radiant intensity of an object or respectively of the landmark can additionally be stored and provided, for example in the case of primary sources.

The detection range of the sensor unit, which has been determined or respectively extrapolated, corrected by environmental influences, can deviate, for example by taking account of the operating parameter—general visibility, light conditions—from the actual detection range of the sensor unit currently achieved.

The currently achieved actual detection range of the sensor unit describes the actual detection range, which is prevailing at the current time and which is actually prevailing and made possible by the prevailing operating parameters at the current time.

In other words, the actually prevailing actual detection range is the result or the sum of the internal attenuation, for instance progressive degradation of the sensor, and the external attenuation, for example the environmental influences acting thereon.

The determined detection range can deviate from this actual detection range since, for example, the operating parameter exerts an influence.

For example, a prevailing weather situation can be added as an operating parameter, so that the actual detection range for an optical sensor cannot be reduced by means of the maximum visibility due to fog.

An ego-position of the vehicle or of the device can additionally be used by the device, wherein the ego-position is used, for example by means of a navigation system, for example by means of a global navigation satellite system for determining the position such as, for example, the global positioning system, abbreviated to GPS.

The device can be configured, for landmarks located within the sensor range, to carry out measurements for the respective landmark object and to compare the actual detection ranges occurring during successful measurements with target measured values or respectively target detection ranges stored in the map.

The comparison algorithm considers, for example and if available, context information such as, for example, the time of day or the prevailing weather in the form of an operating parameter, in order to determine the present range of the sensor for a specific sensor.

In other words, the sensor map can contain information, as represented by the infrastructure and the respective sensor technology deployed.

In this case, the sensor map contains, for example, information such as landmarks which are detected by the respective sensors, i.e. a target detection range can be stored for each landmark, which describes, for example, the distance from which the landmark can be detected by a respective sensor.

By comparing the stored and calculated representation on the basis of the respective landmarks and the associated target detection ranges and the actually measured representation as it is actually detected by the sensor unit, attenuation or respectively a sensor function of the sensor unit can be indicated.

By means of the determination of the existing attenuation or respectively by means of the determination of the actual sensor function, the maximum detection range can also be determined for any object.

In other words, a detection range of the sensor unit can be determined. On approaching the landmark object, the sensor range over the entire distance range can additionally be determined. In this case, the peripheral development such as, for instance, guardrails or road signs can also be used as reference.

The present invention advantageously makes it possible to detect and monitor a degradation of a sensor.

According to a further, second aspect of the present invention, a backend is provided, wherein the backend comprises a device according to the first aspect of the present invention or according to any embodiment of the first aspect of the present invention, wherein the memory unit is designed as a backend memory unit and the backend additionally has an interface unit, which is designed to communicate with the sensor unit configured on the vehicle and/or the computing unit configured on the vehicle.

In other words, the backend comprises a server memory unit and the sensor unit and the computing unit are furthermore installed in a motor vehicle. In this case, the backend can also evaluate the data from multiple motor vehicles and communicate with a plurality of motor vehicles.

According to a further, third aspect of the present invention, a method for determining the range of a sensor for a motor vehicle is provided, wherein the method comprises the following method steps: providing a map having at least one landmark and a target detection range associated with the landmark and/or a reflectivity property associated with the landmark and/or a radiant intensity associated with the landmark with the aid of a memory unit; detecting the at least one landmark with an actual detection range with the aid of a sensor unit and/or measuring a received signal intensity for the at least one detected landmark; and determining a detection range of the sensor unit based on the target detection range and the actual detection range and/or based on a comparison of the signal intensity measured for the respective landmark with the radiant intensity associated with the landmark provided by means of a computing unit.

In an advantageous embodiment of the present invention, it is envisaged that the memory unit is designed to provide the map having the at least one landmark and the target detection range associated with the landmark and/or the associated reflectivity property and/or the associated radiant intensity as a function of a type of sensor unit.

In other words, an optical sensor can have a deviating target detection range when compared with a radar-based sensor or a laser-based sensor. Likewise, the radiant intensity and reflectivity property can be adapted to the frequency range of the respectively used sensors, or can respectively be frequency-dependent.

This advantageously makes it possible to consider different sensor types in an adapted way.

In a further advantageous embodiment of the present invention, it is envisaged that the sensor unit is designed to detect an ego-position of the device and the computing unit is designed to additionally determine the detection range of the sensor unit based on the detected ego-position. This advantageously makes it possible to determine the detection range of the sensor unit precisely and with increased accuracy.

In a further advantageous embodiment of the present invention, it is envisaged that the computing unit is designed to determine the detection range of the sensor unit based on an operating parameter and to use an item of context information such as a time of day and/or brightness and/or visibility and/or air humidity and/or traffic density and/or a weather parameter as the operating parameter.

The precipitation intensity as a weather parameter can, for example, influence a radar-based sensor, i.e. its determined detection range can be reduced.

In a further advantageous embodiment of the present invention, it is envisaged that the computing unit is designed to alter the target detection range stored in the sensor map and/or the radiant intensity and/or the reflectivity property based on the determined detection range. In other words, the actual determined detection range can alter the target detection range and/or the radiant intensity and/or the reflectivity property. This advantageously makes it possible to reliably monitor the sensor function.

In a further advantageous embodiment of the present invention, it is envisaged that the computing unit is designed to additionally alter the target detection range stored in the sensor map and/or the radiant intensity and/or the reflectivity property based on the operating parameter.

This advantageously makes it possible, for example, not to take account of detection ranges which are merely reduced due to fog during the determination of the real target detection range, which advantageously makes it possible for weather conditions to not negatively influence the maximum or in principle desired target detection range.

In a further advantageous embodiment of the present invention, it is envisaged that the memory unit is designed to provide the map having the at least one landmark and the target detection range associated with the landmark and/or the radiant intensity and/or the reflectivity property in the form of a target detection range area and/or a radiant intensity range and/or a reflectivity property range. This advantageously makes it possible to supply a range of values, so that an adjusted value can be calculated.

In a further advantageous embodiment of the present invention, it is envisaged that the sensor unit is configured as an optical image sensor and/or as a radar-based sensor and/or as a laser-based distance sensor.

The described configurations and further developments can be combined in any way with one another.

Further possible configurations, further developments and implementations of the present invention also comprise combinations of features of the present invention, which are described above or below with respect to the embodiments, including those which are not explicitly indicated.

The appended drawings are intended to provide a further understanding of the embodiments of the present invention. The appended drawings illustrate embodiments and, in connection with the description, serve to explain concepts of the present invention.

Other embodiments and many of the indicated advantages are set out with respect to the figures of the drawings. The represented elements of the figures of the drawings are not necessarily shown to scale with respect to one another.

BRIEF DESCRIPTION OF THE FIGURES

FIG. 1: shows a schematic representation of a device for determining the range of a sensor for a motor vehicle according to one embodiment example of the present invention;

FIG. 2: shows a schematic representation of a flow chart of a method for determining the range of a sensor for a motor vehicle according to another embodiment of the present invention;

FIG. 3: shows a schematic representation of a sensor map in order to explain the present invention.

DETAILED DESCRIPTION OF EMBODIMENT EXAMPLES

Figure 4:
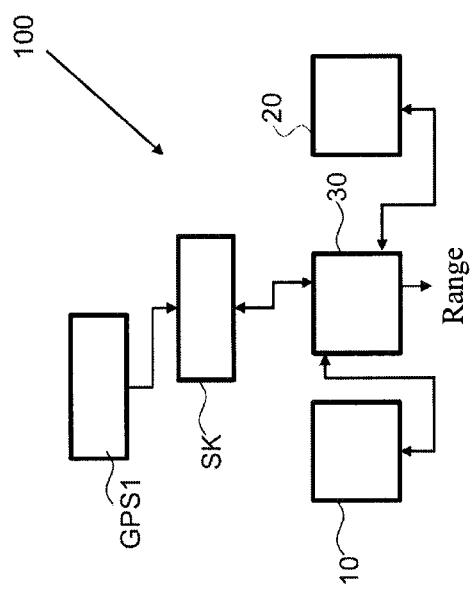
FIG. 4: shows a schematic representation of a backend according to another embodiment of the present invention.

In the figures of the drawings, the same reference numerals denote elements, parts or components or method steps which are the same or which have the same function, unless otherwise indicated.

The motor vehicle or respectively vehicle is, for example, a motor vehicle or a hybrid vehicle such as, for example, a car, a bus or a truck, or also a rail vehicle, a ship, an aircraft such as a helicopter or an airplane or, for example, a bicycle.

FIG. 1 shows a schematic representation of a device for determining the range of a sensor for a motor vehicle according to one embodiment example of the present invention.

The device 1 comprises a memory unit 10, a sensor unit 20 and a computing unit 30.

The memory unit 10 is configured to provide, as an attribute, a map having at least one landmark, and
 i) a target detection range associated with the landmark; and/or
 ii) a reflectivity property associated with the landmark; and/or
 iii) a radiant intensity associated with the landmark.

The sensor unit 20 is configured i) to detect the at least one landmark having an actual detection range; and/or
 ii) to measure a received signal intensity for the at least one landmark.

The computing unit 30 is configured to determine a detection range of the sensor unit 20 based on i) the target detection range and the actual detection range; and/or based on ii) a comparison of the signal intensity measured for the respective landmark and that calculated signal intensity, which can be derived from the reflectivity property recorded in the map for the respective landmark and/or to determine the radiant intensity recorded in the map for the respective landmark.

The map can provide landmarks and target detection ranges associated with the landmarks as a function of a type of sensor unit used in each case.

For example, a stop sign is saved as a landmark and the associated target detection range for an optical camera sensor is 200 m. A reflectivity property and/or a radiant intensity can additionally be stored for the stop sign.

Possible measurements regarding the known ego-position of the motor vehicle—which is, for example, established with GPS—are established from a map which contains landmarks in the respective sensor view, wherein in the case of one possible measurement the landmark is located within the target sensor range with respect to the known ego-position.

Subsequently, the landmark objects are detected by measurement and the actual detection ranges produced in the process are compared with target measured values or respectively target detection ranges which are likewise stored in the map.

During the comparison it can additionally be considered that, if available, items of context information such as the time of day or weather have an influence on the actual detection range, and this influence can, in turn, be calculated from the actual detection range, in order to arrive at a detection range which is independent of the context and which is also described as the determined detection range.

The map can additionally be compiled by motor vehicles which have sensors for driver assistance systems and which are connected to a backend.

In the process, the detection image provided by the vehicles, i.e. the respective actual detection range for a landmark, as achieved by a sensor unit 20 of a determined motor vehicle, can be transmitted to the backend.

The backend can then update the map and amend the target detection range associated with the landmark in accordance with the actual detection range sent.

In the process, the prevailing operating parameter can be considered, for example, by a maximum visibility due to fog.

As a result, structural modifications such as, for example, the addition or removal of traffic signs or natural modifications such as, for example, the overgrown condition of guardrails or covering of the road with leaves, can advantageously be considered.

For example, the sensor unit 20 can be configured as a camera and the recognition performance of the camera, which is also described as the confidence value, can be used during traffic sign recognition, i.e. a traffic sign can be defined as a landmark.

It can then be determined from the map that a traffic sign which is to be recognized as a landmark is located within the range of the sensor unit 20 or respectively the camera.

The term "confidence value" or "recognition confidence", as used by the present invention, describes, for example, the probability with which the sensor unit 20 detects the landmark.

Depending on how high the recognition confidence is, a sensor fault or respectively a degradation in the range of the sensor unit 20 can be indicated on approaching the traffic sign, for example, in the event that the real actual detection range, i.e. the range at which the sensor unit has actually detected the landmark, is significantly below the target detection range.

As the appearance of the specific sensor, for example the radar reflectivity of the infrastructure, can alter, filtering should take place by means of multiple detections and/or landmarks, and an average should be produced.

This averaging can then be used to alter the target detection range associated with the landmark.

The actual detection ranges can be normally averaged, likewise maximum and/or minimum values of the actual detection ranges can be used.

These maximum and/or minimum actual detection ranges can, for example, represent the maximum and/or minimum detection range for ideal weather conditions, i.e. if there is clear visibility in the case of optical sensors.

In the case of radar-based sensor systems, reflections from bushes and grass at the edge of the roadway are dependent on the season, for example, whereas strong reflections, for example from bridges, traffic signs, larger trees and tunnel infrastructure are largely constant.

However, an increased traffic density can additionally likewise lead to an increased reflection of radar waves.

In the case of radar, the reflectivity of the road surface can additionally be used as a possible measure of the sensor map, since the road reflectivity depends on how badly worn the covering is and what the present road condition is like, for example whether it is dry or wet or covered with ice or sludge, information which is permanently updated via the backend should then be supplied.

For example, the ratio between the reflected and incident intensity of the radar radiation is defined as the reflectivity or degree of reflection.

FIG. 2 shows a schematic representation of a flow chart of a method for determining the range of a sensor for a motor vehicle.

The method represented in FIG. 2 comprises, for example, the following method steps:

As a first method step, for example, a map having at least one landmark and a target detection range associated with the landmark and/or a reflectivity property associated with the landmark and/or a radiant intensity associated with the landmark is provided (S10) with the aid of a memory unit 10.

As a second step, for example, the at least one landmark is detected (S2) with an actual detection range with the aid of a sensor unit 20 and/or a received signal intensity for the at least one landmark is measured with the aid of a sensor unit 20.

As a third step of the method, for example, a detection range of the sensor unit 20 is determined (S3) based on the target detection range and the actual detection range and/or based on a comparison of the signal intensity measured for the respective landmark and a received signal intensity, which can be derived from the reflectivity property recorded in the map and/or the radiant intensity of the respective landmark, by means of a computing unit 30.

FIG. 3 shows a schematic representation of a map in order to explain the present invention.

For example, two landmarks L1, L2 which are, for example, trees at the edge of the road, are represented on the map as represented in FIG. 3.

A traffic sign is additionally represented in the environment of the road S. The traffic sign can, for example, be used as a landmark L3.

In this case, the fact that an associated target detection range of, for example, 300 m is provided for the landmark L3 can additionally be stored in the sensor map or respectively the map. A target detection range of 200 m to 500 m can additionally be saved.

A reflectivity property in the form of a reflectivity property range can additionally be stored.

A radiant intensity, for example 5 mW/sr, in Watts (W) per steradian (sr), or a radiant intensity range, for example 5 mW/sr to 15 mW/sr can additionally be stored.

This can be defined, for example, for optical sensors. This means that optical sensors are intended to recognize the landmark L3 in the form of the traffic sign as of a distance of 300 m.

FIG. 4 shows a schematic illustration of a backend according to a further embodiment of the present invention.

A position determination system GPS1 establishes the present position of the motor vehicle, also called the ego-position. This ego-position can be supplied to the computing unit.

The computing unit 30 can additionally evaluate a map SK or respectively a sensor map.

The computing unit 30 is additionally coupled to a sensor unit 20 and a memory unit 10.

The computing unit 30 is, for example, designed to determine a range, i.e. a detection range of the sensor unit 20 which is interpolated for idealized conditions.

In the case of the backend 100 represented in FIG. 4, the components such as, for example, the memory unit 10, the sensor unit 20 and the computing unit 30 can be installed in any combination both on the vehicle and on the server.

Although the present invention has been described above on the basis of preferred embodiment examples, it is not restricted to these, but can be modified in many ways. In particular, the present invention can be amended or modified in multiple ways, without deviating from the core of the invention.

In addition, it is pointed out that "comprising" and "having" do not exclude any other elements or steps and "a" or "one" does not exclude a plurality.

It is additionally pointed out that features or steps which have been described with reference to one of the above embodiment examples can also be used in combination with other features or steps of other embodiment examples described above. Reference numerals in the claims are not to be viewed as restrictions.

The invention claimed is:

1. A device for determining a sensor detection range of a sensor unit for a motor vehicle, wherein the device comprises:
    a memory unit configured to provide a map that stores map data regarding a landmark and at least one landmark property associated with the landmark, wherein the at least one landmark property is at least one of a target detection range associated with the landmark, a reflectivity property associated with the landmark, and/or a radiant intensity associated with the landmark;
    a sensor unit configured to detect the landmark in surroundings of the motor vehicle, and to determine an actual detection range of the landmark and/or a received signal intensity for the detection of the landmark; and a computing unit configured to determine a sensor detection range of the sensor unit based on the target detection range and the actual detection range, and/or based on a comparison of the received signal intensity and a calculated signal intensity that is derived from the reflectivity property and/or the radiant intensity.

2. The device according to claim 1, wherein the memory unit is configured to provide the map having the at least one landmark property comprising the target detection range, the reflectivity property and/or the radiant intensity dependent on a type of the sensor unit.

3. The device according to claim 1, wherein the sensor unit is configured to detect an ego-position of the device, and the computing unit is configured to determine the sensor detection range additionally based on the ego-position.

4. The device according to claim 1, wherein the computing unit is configured to determine the sensor detection range additionally based on a parameter of the surroundings that is at least one of a time of day, a brightness, a visibility, an air humidity, a traffic density, and/or a weather parameter.

5. The device according to claim 4, wherein the computing unit is configured to alter the target detection range, the radiant intensity, and/or the reflectivity property stored in the map, based on the parameter of the surroundings.

6. The device according to claim 1, wherein the computing unit is configured to alter the target detection range, the radiant intensity, and/or the reflectivity property stored in the map, based on the sensor detection range.

7. The device according to claim 1, wherein the memory unit is configured to provide the target detection range as a range of target detection range values, to provide the radiant intensity as a range of radiant intensity values, and/or to provide the reflectivity property as a range of reflectivity property values.

8. The device according to claim 1, wherein the sensor unit comprises an optical image sensor, a radar-based sensor, and/or a laser-based distance sensor.

9. A backend comprising a device according to claim 1, wherein the memory unit is a backend memory unit, and the backend additionally comprises an interface unit configured to communicate with the sensor unit configured on the vehicle and/or with the computing unit configured on the vehicle.

10. A method of determining a sensor detection range of a sensor unit for a motor vehicle, wherein the method comprises the steps:

from a memory unit, providing a map that stores map data regarding a landmark and at least one landmark property associated with the landmark, wherein the at least one landmark property is at least one of a target detection range associated with the landmark, a reflectivity property associated with the landmark, and/or a radiant intensity associated with the landmark;

with a sensor unit, detecting the landmark in surroundings of the motor vehicle, and determining an actual detection range of the landmark and/or a received signal intensity for the detection of the actual landmark; and with a computing unit, determining a sensor detection range of the sensor unit based on the target detection range and the actual detection range, and/or based on a comparison of the received signal intensity and a calculated signal intensity that is derived from the reflectivity property and/or the radiant intensity.

11. The device according to claim 1, wherein the at least one landmark property comprises the target detection range, the sensor unit is configured to determine the actual detection range, and the computing unit is configured to determine the sensor detection range based on the target detection range and the actual detection range.

12. The device according to claim 1, wherein the at least one landmark property comprises the reflectivity property, the sensor unit is configured to determine the received signal intensity, and the computing unit is configured to derive the calculated signal intensity from the reflectivity property and to determine the sensor detection range based on the comparison of the received signal intensity and the calculated signal intensity.

13. The device according to claim 1, wherein the at least one landmark property comprises the radiant intensity, the sensor unit is configured to determine the received signal intensity, and the computing unit is configured to derive the calculated signal intensity from the radiant intensity and to determine the sensor detection range based on the comparison of the received signal intensity and the calculated signal intensity.

14. The method according to claim 10, wherein the at least one landmark property comprises the target detection range, the sensor unit determines the actual detection range, and the computing unit determines the sensor detection range based on the target detection range and the actual detection range.

15. The method according to claim 10, wherein the at least one landmark property comprises the reflectivity property, the sensor unit determines the received signal intensity, and the computing unit derives the calculated signal intensity from the reflectivity property and determines the sensor detection range based on the comparison of the received signal intensity and the calculated signal intensity.

16. The method according to claim 10, wherein the at least one landmark property comprises the radiant intensity, the sensor unit determines the received signal intensity, and the computing unit derives the calculated signal intensity from the radiant intensity and determines the sensor detection range based on the comparison of the received signal intensity and the calculated signal intensity.

\* \* \* \* \*